(12) United States Patent
Kupratis et al.

(10) Patent No.: US 11,215,143 B2
(45) Date of Patent: *Jan. 4, 2022

(54) GEARED TURBOFAN ARRANGEMENT WITH CORE SPLIT POWER RATIO

(71) Applicant: RAYTHEON TECHNOLOGIES CORPORATION, Farmington, CT (US)

(72) Inventors: Daniel Bernard Kupratis, Wallingford, CT (US); Frederick M. Schwarz, Glastonbury, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 185 days.

This patent is subject to a terminal disclaimer.

(21) Appl. No.: 16/684,968

(22) Filed: Nov. 15, 2019

(65) Prior Publication Data

US 2020/0109684 A1 Apr. 9, 2020

Related U.S. Application Data

(63) Continuation of application No. 14/964,607, filed on Dec. 10, 2015, now Pat. No. 10,502,163, which is a
(Continued)

(51) Int. Cl.
*F02C 7/36* (2006.01)
*F02K 3/06* (2006.01)
*F02C 3/107* (2006.01)

(52) U.S. Cl.
CPC .............. *F02K 3/06* (2013.01); *F02C 3/107* (2013.01); *F02C 7/36* (2013.01); *F05D 2260/20* (2013.01);
(Continued)

(58) Field of Classification Search
CPC ..................................... F02K 3/06; F02K 7/36
See application file for complete search history.

(56) References Cited

U.S. PATENT DOCUMENTS

| 2,258,792 A | 4/1941 | New |
| 2,936,655 A | 5/1960 | Peterson et al. |

(Continued)

FOREIGN PATENT DOCUMENTS

| EP | 0791383 | 8/1997 |
| EP | 1142850 | 10/2001 |

(Continued)

OTHER PUBLICATIONS

Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.

(Continued)

*Primary Examiner* — Gerald L Sung
(74) *Attorney, Agent, or Firm* — Carlson, Gaskey & Olds, P.C.

(57) ABSTRACT

A gas turbine engine according to an example of the present disclosure includes, among other things, a fan section, and a compressor section including a low pressure compressor and a second compressor section, and a turbine section including a fan drive turbine and a high pressure turbine. The fan drive turbine drives the low pressure compressor and a gear arrangement to drive the fan section. A core split power ratio is provided by power input to the high pressure compressor divided by a power input to the low pressure compressor measured in horsepower.

34 Claims, 4 Drawing Sheets

Related U.S. Application Data continuation-in-part of application No. 14/177,372, filed on Feb. 11, 2014, now Pat. No. 10,267,228.

(60) Provisional application No. 61/898,731, filed on Nov. 1, 2013, provisional application No. 61/899,464, filed on Nov. 4, 2013.

(52) U.S. Cl.
CPC ............... F05D 2260/40311 (2013.01); F05D 2300/40 (2013.01); F05D 2300/603 (2013.01); F05D 2300/606 (2013.01); Y02T 50/60 (2013.01)

(56) References Cited

U.S. PATENT DOCUMENTS

| | | |
|---|---|---|
| 3,021,731 A | 2/1962 | Stoeckicht |
| 3,194,487 A | 7/1965 | Tyler et al. |
| 3,287,906 A | 11/1966 | McCormick |
| 3,352,178 A | 11/1967 | Lindgren et al. |
| 3,412,560 A | 11/1968 | Gaubatz |
| 3,664,612 A | 5/1972 | Skidmore et al. |
| 3,747,343 A | 7/1973 | Rosen |
| 3,754,484 A | 8/1973 | Roberts |
| 3,765,623 A | 10/1973 | Donelson et al. |
| 3,820,719 A | 6/1974 | Clark |
| 3,843,277 A | 10/1974 | Ehrich |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,130,872 A | 12/1978 | Harloff |
| 4,220,171 A | 9/1980 | Ruehr |
| 4,240,250 A | 12/1980 | Harris |
| 4,251,987 A | 2/1981 | Adamson |
| 4,284,174 A | 8/1981 | Salvana et al. |
| 4,289,360 A | 9/1981 | Zirin |
| 4,478,551 A | 10/1984 | Honeycutt, Jr. et al. |
| 4,649,114 A | 3/1987 | Miltenburger et al. |
| 4,696,156 A | 9/1987 | Burr et al. |
| 4,722,357 A | 2/1988 | Wynosky |
| 4,782,658 A | 11/1988 | Perry |
| 4,827,712 A | 5/1989 | Coplin |
| 4,916,894 A | 4/1990 | Adamson et al. |
| 4,979,362 A | 12/1990 | Vershure, Jr. |
| 5,058,617 A | 10/1991 | Stockman et al. |
| 5,079,916 A | 1/1992 | Johnson |
| 5,102,379 A | 4/1992 | Pagluica et al. |
| 5,141,400 A | 8/1992 | Murphy et al. |
| 5,317,877 A | 6/1994 | Stuart |
| 5,361,580 A | 11/1994 | Ciokajlo et al. |
| 5,433,674 A | 7/1995 | Sheridan et al. |
| 5,447,411 A | 9/1995 | Curley et al. |
| 5,466,198 A | 11/1995 | McKibbin et al. |
| 5,524,847 A | 6/1996 | Brodell et al. |
| 5,634,767 A | 6/1997 | Dawson |
| 5,677,060 A | 10/1997 | Terentieva et al. |
| 5,778,659 A | 7/1998 | Duesler et al. |
| 5,809,772 A | 9/1998 | Giffin, III et al. |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,223,616 B1 | 5/2001 | Sheridan |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,517,341 B1 | 2/2003 | Brun et al. |
| 6,607,165 B1 | 8/2003 | Manteiga et al. |
| 6,709,492 B1 | 3/2004 | Spadaccini et al. |
| 6,814,541 B2 | 11/2004 | Evans et al. |
| 6,883,303 B1 | 4/2005 | Seda |
| 6,895,741 B2 | 5/2005 | Rago et al. |
| 7,021,042 B2 | 4/2006 | Law |
| 7,219,490 B2 | 1/2007 | Dev |
| 7,328,580 B2 | 2/2008 | Lee et al. |
| 7,374,403 B2 | 5/2008 | Decker et al. |
| 7,591,754 B2 | 9/2009 | Duong et al. |
| 7,632,064 B2 | 12/2009 | Somanath et al. |
| 7,662,059 B2 | 2/2010 | McCune |
| 7,806,651 B2 | 10/2010 | Kennepohl et al. |
| 7,824,305 B2 | 11/2010 | Duong et al. |
| 7,828,682 B2 | 11/2010 | Smook |
| 7,926,260 B2 | 4/2011 | Sheridan et al. |
| 7,997,868 B1 | 8/2011 | Liang et al. |
| 8,075,261 B2 | 12/2011 | Merry et al. |
| 8,104,262 B2 | 1/2012 | Marshall |
| 8,205,432 B2 | 6/2012 | Sheridan |
| 8,257,024 B1 | 9/2012 | Phillips et al. |
| 2004/0255590 A1 | 12/2004 | Rago et al. |
| 2005/0241292 A1 | 11/2005 | Taylor et al. |
| 2006/0228206 A1 | 10/2006 | Decker et al. |
| 2007/0012026 A1 | 1/2007 | Dev |
| 2008/0003096 A1 | 1/2008 | Kohli et al. |
| 2008/0116009 A1 | 5/2008 | Sheridan et al. |
| 2008/0149445 A1 | 6/2008 | Kern et al. |
| 2008/0317588 A1 | 12/2008 | Grabowski et al. |
| 2009/0056343 A1 | 3/2009 | Suciu et al. |
| 2009/0071121 A1 | 3/2009 | Suciu et al. |
| 2009/0293445 A1 | 12/2009 | Ress, Jr. |
| 2009/0304518 A1 | 12/2009 | Kodama et al. |
| 2009/0314881 A1 | 12/2009 | Suciu et al. |
| 2010/0083631 A1 | 4/2010 | Foster et al. |
| 2010/0105516 A1 | 4/2010 | Sheridan et al. |
| 2010/0148396 A1 | 6/2010 | Xie et al. |
| 2010/0212281 A1 | 8/2010 | Sheridan |
| 2010/0218483 A1 | 9/2010 | Smith |
| 2010/0219779 A1 | 9/2010 | Bradbrook |
| 2010/0331139 A1 | 12/2010 | McCune |
| 2011/0056208 A1 | 3/2011 | Norris et al. |
| 2011/0083416 A1 | 4/2011 | Scothern |
| 2011/0159797 A1 | 6/2011 | Beltman et al. |
| 2011/0293423 A1 | 12/2011 | Bunker et al. |
| 2012/0073263 A1* | 3/2012 | Kohlenberg ............ F04D 29/38 60/226.3 |
| 2012/0124964 A1 | 5/2012 | Hasel et al. |
| 2012/0171018 A1* | 7/2012 | Hasel ........................ F02C 7/00 415/122.1 |
| 2013/0259653 A1 | 10/2013 | Schwarz et al. |
| 2013/0287545 A1 | 10/2013 | Suciu et al. |

FOREIGN PATENT DOCUMENTS

| | | |
|---|---|---|
| GB | 1516041 | 6/1978 |
| GB | 2041090 | 9/1980 |
| GB | 2426792 | 12/2006 |
| WO | 2007038674 | 4/2007 |
| WO | 2008045072 | 4/2008 |

OTHER PUBLICATIONS

Johnston, R.P. and Hemsworth, M.C. (1978). Energy efficient engine preliminary design and integration studies. Jun. 1, 1978. pp. 1-28.

Awker, R.W. (1986). Evaluation of propfan propulsion applied to general aviation. NASA CR-175020. Mar. 1, 1986. pp. 1-140.

Howe, D C. and Wynosky, T.A. (1985). Energy efficient engine program advanced turbofan nacelle definition study. NASA CR-174942. May 1, 1985. pp. 174.

Singh, B. (1986). Small engine component technology (SECT) study. NASA CR-175079. Mar. 1, 1986. pp. 1-102.

Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp 1-187.

Anderson, R.D. (1985). Advanced Propfan Engine Technology (APET) definition study, single and counter-rotation gearbox/pitch change mechanism design. NASA CR-168115. Jul. 1, 1985. pp 1-289.

Newton, F.C., Liebeck, R.H., Mitchell, G.H., Mooiweer, M.A., Platte, M.M., Toogood, T.L., and Wright, R.A. (1986). Multiple (56) References Cited

OTHER PUBLICATIONS

Application Propfan Study (MAPS): Advanced tactical transport. NASA CR-175003. Mar. 1, 2986. pp. 1-101.
Gliebe, P.R., Ho, P.Y., and Mani, R. (1995). UHB engine fan and broadband noise reduction study. NASA CR-198357. Jun. 1995. pp. 1-48.
Holcombe, V. (2003). Aero-Propulsion Technology (APT) task V low noise ADP engine definition study. NASA CR-2003-212521. Oct. 1, 2003. pp. 1-73.
Sutliff, D. (2005). Rotating rake turbofan duct mode measurement system. NASA TM-2005-213828. Oct. 1, 2005. pp. 1-34.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
NASA Conference Publication. (1978). CTOL transport technology. NASA-CP-2036-PT-1. Jun. 1, 1978. pp. 1-531.
Gray, D.E. (1978). Energy efficient engine preliminary design and integration studies. NASA-CP-2036-PT-1. Nov. 1978. pp. 89-110.
Kandebo, S.W. (1993). Pratt & Whitney launches geared turbofan engine. Aviation Week & Space Technology, 148(8). p. 32-4.
Kandebo, S.W. (1993). Geared-Turbofan engine design targets cost, complexity. Aviation Week & Space Technology, 148(8). p. 34-5.
Davis, D.G.M. (1973). Variable-pitch fans: Progress in Britain. Flight International. Apr. 19, 1973. pp. 615-617.
Levintan, R.M. (1975). Q-Fan demonstrator engine. Journal of Aircraft. vol. 12( 8). Aug. 1975. pp. 658-663.
Aerospace Information Report. (2008). Advanced ducted propulsor in-flight thrust determination. SAE International AIR5450. Aug. 2008 p. 1-392.
Technical Report. (1975). Quiet Clean Short-haul Experimental Engine (QCSEE) UTW fan preliminary design. NASA-CR-134842. Feb. 1, 1975. pp 1-98.
Daggett, I, D.L., Brown, S.T., and Kawai, R.T. (2003). Ultra-efficient engine diameter study. NASA/CR-2003-212309. May 2003. pp. 1-52.
Technical Report. (1975). Quiet Clean Short-haul Experimental Engine (QCSEE) Under-the-Wing (UTW) final design report. NASA-CR-134847. Jun. 1, 1977. pp. 1-697.
Kandebo, S.W. (1998). Geared-Turbofan engine design targets cost, complexity. Aviation Week & Space Technology, 148(8). p. 34-5.
Daggett, D.L., Brown, S.T., and Kawai, R.T. (2003). Ultra-efficient engine diameter study. NASA/CR-2003-212309. May 2003. pp. 1-52.
Winn, A. (Ed). (1990). Wide Chord Fan Club. Flight International, 4217(137). May 23-29, 1990. pp. 34-38.
Parker, R.G. and Lin, J. (2001). Modeling, modal properties, and mesh stiffness variation instabilities of planetary gears. Prepared for NASA. NASA/CR-2001-210939. May 2001. pp. 1-111.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Product Brochure. Garrett TFE/31. Allied Signal. Copyright 1987. pp. 1-24.
Honeywell Learjet 31 and 35/36 TFE731-2 to 2C Engine Upgrade Program. Sep. 2005. pp. 1-4.
Honeywell Sabreliner 65 TFE731-3 to—3D Engine Upgrade Program. Oct. 2005. pp. 1-4.
U.S. Department of Transportation: Federal Aviation Administration Type Certificate Data Sheet No. E6WE. Dated: May 9, 2000. p. 1-9.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero engines. ASME. Presented at the International Gas Turbine & Aeroengine Congress & Exhibition. Indianapolis, Indiana. Jun. 7-10, 1999. pp. 1-9.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
About GasTurb. Retrieved Jun. 26, 2018 from: http://gasturb.de/about-gasturb.html.
Kurzke, J. (2001). GasTurb 9: A program to calculate design and off-design performance of gas turbines. Retrieved from: https://www.scribd.com/document/92384867/GasTurb9Manual.
Tummers, B. (2006). DataThief III. Retrieved from: https://datathief.org/DatathiefManual.pdf pp. 1-52.
Manual. Student's Guide to Learning SolidWorks Software. Dassault Systemes—SolidWorks Corporation. pp. 1-156.
Macisaac, B. and Langston, R. (2011). Gas turbine propulsion systems. Chichester, West Sussex: John Wiley & Sons, Ltd. pp. 260-265.
Datasheet. CFM56-5B For the Airbus A320ceo family and CFM56-7B for the Boeing 737 family. https://www.cfmaeroengines.com/.
Turner, M. G., Norris, A., and Veres, J.P. (2004). High-fidelity three-dimensional simulation of the GE90. NASA/TM-2004-212981. pp. 1-18.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.
Singh, A. (2005). Application of a system level model to study the planetary load sharing behavior. Jounal of Mechanical Design. vol. 127. May 2005. pp. 469-476.
Smith-Boyd, L. and Pike, J. (1986). Expansion of epicyclic gear dynamic analysis program. Prepared for NASA. NASA CR-179563. Aug. 1986 pp. 1-98.
Wikipedia. Torsion spring. Retreived Jun. 29, 2018 from: https://en.wikipedia.org/wiki/Torsion_spring.
AGMA Standard (2006). Design manual for enclosed epicyclic gear drives. Alexandria, VA: American Gear Manufacturers Association, pp. 1-104.
AGMA Standard (1997). Design and selection of components for enclosed gear drives, lexandria, VA: American Gear Manufacturers Association, pp. 1-48.
Daly, M. Ed. (2007). Jane's Aero-Engine. Issue Twenty-three. Mar. 2008. p. 707-12.
AGMA Standard (1999). Flexible couplings—Mass elastic properties and other characteristics. Alexandria, VA: American Gear Manufacturers Association. pp. 1-46.
Wikipedia. Stiffness. Retrieved Jun. 28, 2018 from: https://en.wikipedia.org/wiki/Stiffness.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Ciepluch, C. (1977). Quiet clean short-haul experimental engine (QCSEE) under-the-wing (UTW) final design report. Prepared for (56) References Cited

OTHER PUBLICATIONS

NASA. NASA-CP-134847. Retreived from: https://ntrs.nasa.gov/archive/nasa/casi.ntrs.nasa.gov/19800075257.pdf.
Gray, D.E. and Gardner, W.B. (1983). Energy efficient engine program technology benefit/cost study—vol. 2. NASA CR-174766. Oct. 1983. pp. 1-118.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Howe, D.C., and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942 May 1985. University of Washington dated Dec. 13, 1990. pp. 1-14.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Johnston, R.P., Hirschkron, R. Koch, C.C., Neitzel, R.E., and Vinson, P.W. (1978). Energy efficient angine: Preliminary design and integration study—final report. NASA CR-135444. Sep. 1978. pp. 1-401.
Davies, D. and Miller, D.C. (1971). A variable pitch fan for an ultra quiet demonstrator engine. 1976 Spring Convention: Seeds for Success in Civil Aircraft Design in the Next Two Decades, pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill. pp. 87-153.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.

Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.H. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, JR., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA (56) References Cited

OTHER PUBLICATIONS

Technical Memorandum. Prepared for the Design Technical Conference (ASME). Sep. 11-13, 1985. pp. 1-26.
Mccune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report. Prepared for NASA. NASA CR-165608. pp. 1-178.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Gray, D.E. (1978). Energy efficient engine preliminary design and integration studies. Prepared for NASA. NASA CR-135396. Nov. 1978 pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Mcardle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
Datasheet. CF6-80C2 high-bypass turbofan engines. Retrieved from https://geaviation.com/sites/default/files/datasheet-CF6-80C2.pdf.
Salemme, C.T. and Murphy, G.C. (1979). Metal spar/superhybrid shell composite fan blades. Prepared for NASA. NASA-CR-159594. Aug. 1979. pp. 1-127.
"Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".
Datasheet. Genx™ high bypass turbofan engines. Retreived from: https://www.geaviation.com/sites/default/files/datasheet-genx.pdf.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.

Hendricks, E.S. and Tong, M.T. (2012). Performance and weight estimates for an advanced open rotor engine. NASA/TM-2012-217710. pp 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., Macmartin, D.G., and Tillman, T.G. (2000). Flow control opportunities in gas turbine engines. American Institute of Aeronautics and Astronautics, pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p 45-47.
Norton, M. and Karczub, D. (2003). Fundamentals of noise and vibration analysis for engineers. Press Syndicate of the University of Cambridge New York: New York, p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.

(56) References Cited

OTHER PUBLICATIONS

Krenkel, W., Naslain, R., and Schneider, H. Eds. (2001). High temperature ceramic matrix composites pp. 224-229. Weinheim, DE: Wiley-VCH Verlag GmbH.

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.

Shah, D M. (1992). MoSi2 and other silicides as high temperature structural materials. Superalloys 1992. The Minerals, Metals, & Materials Society, pp. 409-422.

Zhao, J.C. and Westbrook, J.H. (2003). Ultrahigh-temperature materials for jet engines. MRS Bulletin. Vol. 28 (9). Sep. 2003. pp. 622-630.

Tsirlin, M., Pronin, Y.E., Florina, E.K., Mukhametov, S. Kh., Khatsernov, M.A., Yun, H.M., ... Kroke, E. (2001). Experimental investigation of multifunctional interphase coatings on SiC fibers for non-oxide high temperature resistant CMCs. High Temperature Ceramic Matrix Composites. 4th Int'l Conf, on High Temp. Ceramic Matrix Composites. Oct. 1-3, 2001. pp. 149-156.

Jacobson, N.S. (1993). Corrosion of silicon-based ceramics in combustion environments. J. Am. Ceram. Soc. 76 (1). pp. 3-28.

Jorgensen, P.J., Wadsworth, M.E., and Cutler, I.B. (1961). Effects of water vapor on oxidation of silicon carbide. J. Am. Ceram. Soc. 44(6). pp. 248-261.

Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Jeng, Y.-L., Lavernia, E.J. (1994). Processing of molybdenum disilicide. J. of Mat. Sci. vol. 29. 1994. pp. 2557-2571.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer. pp. 1-3.

El-Sayad, A.F. (2008). Aircraft propulsion and gas turbine engines. Boca Raton, FL: CRC Press. pp. 215-219 and 855-860.

Bunker, R.S. (2005). A review of shaped hole turbine film-cooling technology. Journal of Heat Transfer vol. 127. Apr. 2005. pp. 441-453.

Gas power cycle-jet propulsion technology: A Case Study. Machine Design Magazine. Nov. 5, 1998.

International Search Report for International Application No. PCT/US2014/0062764 completed Jun. 5, 2015.

International Preliminary Report on Patentability for International Application No. PCT/US2014/062764 dated May 12, 2016.

European Search Report for European Patent Application No. 14880285 completed Jun. 1, 2017.

Mcmillian, A. (2008) Material development for fan blade containment casing. Abstract, p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida, pp. 145-153.

Agarwal, B.D and Broutman, L.J. (1990). Analysis and performance of fiber composites, 2nd Edition. John Wiley & Sons, Inc. New York: New York. pp. 1-30, 50-1, 56-8, 60-1, 64-71, 87-9, 324-9, 436-7.

Carney, K., Pereira, M. Revilock, and Matheny, P. (2003) Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis, pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press, p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press, p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp 3-9.

Oates, G.C. (Ed). (1989). Aircraft propulsion systems and technology and design. Washington, DC.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

(56) References Cited

OTHER PUBLICATIONS

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Fledderjohn, K.R. (1983). The IFE731-5: Evolution of a decade of business jet service. SAE Technical Paper Series. Business Aircraft Meeting & Exposition. Wichita, Kansas. Apr. 12-15, 1983. pp 1-12.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Gunston, B. (Ed.) (2000). Jane's aero-engines, Issue seven. Coulsdon, Surrey, UK: Jane's Information Group Limited. pp. 510-512.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

* cited by examiner

GEARED TURBOFAN ARRANGEMENT WITH CORE SPLIT POWER RATIO

CROSS-REFERENCE TO RELATED APPLICATION

This application is a continuation of U.S. patent application Ser. No. 14/964,607, filed on Dec. 10, 2015, which is a continuation-in-part of U.S. patent application Ser. No. 14/177,372, filed on Feb. 11, 2014 and issued as U.S. Pat. No. 10,267,228, which claims priority to U.S. Provisional Application No. 61/898,731, filed on Nov. 1, 2013; and U.S. Provisional Application No. 61/899,464, filed on Nov. 4, 2013.

BACKGROUND

This application relates to a core arrangement for a gas turbine engine.

Gas turbine engines are known, and typically include a fan delivering air into a low pressure compressor section. The air is compressed in the low pressure compressor section, and passed into a high pressure compressor section. From the high pressure compressor section the air is introduced into a combustion section where it is mixed with fuel and ignited. Products of this combustion pass downstream over a high pressure turbine section, and then a low pressure turbine section.

Traditionally, the low pressure turbine section has driven both the low pressure compressor section and a fan directly. As fuel consumption improves with larger fan diameters relative to core diameters it has been the trend in the industry to increase fan diameters. However, as the fan diameter is increased, high fan blade tip speeds may result in a decrease in efficiency due to compressibility effects. Accordingly, the fan speed, and thus the speed of the low pressure compressor section and low pressure turbine section (both of which historically have been coupled to the fan via the low pressure spool), has been a design constraint.

More recently, gear reductions have been proposed between the low pressure spool (low pressure compressor section and low pressure turbine section) and the fan.

SUMMARY

A gas turbine engine according to an example of the present disclosure includes a fan section, a compressor section, including at least a first compressor section and a second compressor section, a turbine section including at least one turbine to drive the second compressor section, and a fan drive turbine to drive at least a gear arrangement to drive the fan section. The turbine section includes at least two turbine stages upstream of the fan drive turbine. A power ratio is provided by the combination of the first compressor section and the second compressor section. The power ratio is provided by a first power input to the first compressor section and a second power input to the second compressor section. The power ratio is equal to, or greater than, 1.0 and less than, or equal to, 1.4.

In a further embodiment of any of the foregoing embodiments, the power ratio is less than 1.27.

In a further embodiment of any of the foregoing embodiments, the fan drive turbine includes six or fewer stages.

In a further embodiment of any of the foregoing embodiments, the fan section is configured to deliver a portion of air into the compressor section, and a portion of air into a bypass duct, and wherein a bypass ratio, which is defined as a volume of air passing to the bypass duct compared to a volume of air passing into the compressor section, is equal to or greater than 10.

In a further embodiment of any of the foregoing embodiments, a gear ratio of the gear arrangement is greater than 2.6.

In a further embodiment of any of the foregoing embodiments, an overall pressure ratio is provided by the combination of the first compressor section, the second compressor section and a fan root pressure rise of the fan section. The overall pressure ratio is equal to or greater than 36.

In a further embodiment of any of the foregoing embodiments, the fan section defines a fan pressure ratio less than 1.50. The first turbine section is configured to rotate at least 2.6 times faster than the fan section, and an overall pressure ratio is provided by the combination of the first compressor section, the second compressor section and a fan root pressure rise of the fan section. The overall pressure ratio is equal to or greater than 36.

In a further embodiment of any of the foregoing embodiments, the first compressor section includes 3 or more stages and the second compressor section includes between 8 and 15 stages.

In a further embodiment of any of the foregoing embodiments, the fan drive turbine includes three 3 to six 6 stages.

In a further embodiment of any of the foregoing embodiments, the fan drive turbine defines a fan drive turbine pressure ratio that is greater than five.

A gas turbine engine according to an example of the present disclosure includes a fan section, and a compressor section, including at least a first compressor section and a second compressor section. The first compressor section includes 3 or more stages and the second compressor section including 6 or more stages. A turbine section includes at least one turbine to drive the second compressor section and a fan drive turbine to drive at least a gear arrangement to drive the fan section. The turbine section includes at least 2 turbine stages upstream of the fan drive turbine. A power ratio is provided by the combination of the first compressor section and the second compressor section, with the power ratio being provided by a first power input to the first compressor section and a second power input to the second compressor section. The power ratio is equal to or greater than 1.0. An overall pressure ratio is provided by the combination of the first compressor section. The second compressor section and a fan root pressure rise of the fan section. The overall pressure ratio is equal to, or greater than, 36.

In a further embodiment of any of the foregoing embodiments, the fan section defines a fan pressure ratio less than 1.50, a gear ratio of the gear arrangement is greater than 2.6, the turbine section includes at least 2 turbine stages upstream of the fan drive turbine, and the fan drive turbine includes 3 to 6 stages.

In a further embodiment of any of the foregoing embodiments, the power ratio is between 1.0 and 1.4.

In a further embodiment of any of the foregoing embodiments, the fan section defines a fan pressure ratio less than 1.45.

In a further embodiment of any of the foregoing embodiments, the fan drive turbine defines a fan drive turbine pressure ratio that is greater than five (5).

In a further embodiment of any of the foregoing embodiments, the power ratio is less than 1.27.

In a further embodiment of any of the foregoing embodiments, the fan section is configured to deliver a portion of air into the compressor section, and a portion of air into a bypass duct, and wherein a bypass ratio, which is defined as a volume of air passing to the bypass duct compared to a volume of air passing into the compressor section, is equal to or greater than 12.

A gas turbine engine according to an example of the present disclosure includes a fan section, a compressor section, including at least a first compressor section and a second compressor section, a turbine section including at least one turbine to drive the second compressor section, and a fan drive turbine to drive at least a gear arrangement to drive the fan section. A power ratio is provided by the combination of the first compressor section and the second compressor section, with the power ratio being provided by a first power input to the first compressor section and a second power input to the second compressor section. The power ratio is equal to or less than 1.4. An overall pressure ratio is provided by the combination of the first compressor section, the second compressor section and a fan root pressure rise of the fan section. The overall pressure ratio is equal to or greater than 36.

In a further embodiment of any of the foregoing embodiments, the first compressor section includes 3 or more stages. The second compressor section includes 6 or more stages. The turbine section includes at least 2 turbine stages upstream of the fan drive turbine, and the fan drive turbine includes three 3 to six 6 stages.

In a further embodiment of any of the foregoing embodiments, the power ratio is greater than or equal to 1.0.

In a further embodiment of any of the foregoing embodiments, the fan section is configured to deliver a portion of air into the compressor section, and a portion of air into a bypass duct, and wherein a bypass ratio, which is defined as a volume of air passing to the bypass duct compared to a volume of air passing into the compressor section, is equal to or greater than 10.

A method of designing a gas turbine engine according to an example of the present disclosure includes providing a fan section, providing a compressor section, including a first compressor section and a second compressor section, and providing a turbine section including at least one turbine to drive the second compressor section and a fan drive turbine to drive the fan section via a gear arrangement. A power ratio is provided by the combination of the first compressor section and the second compressor section, with the power ratio being provided by a first power input to the first compressor section and a second power input to the second compressor section. The power ratio is equal to or less than 1.4 at a predetermined design target. An overall pressure ratio is provided by the combination of the first compressor section the second compressor section and a fan root pressure rise of the fan section. The overall pressure ratio is equal to or greater than 36 at the predetermined design target.

In a further embodiment of any of the foregoing embodiments, the predetermined design target is defined at sea level and at a static, full-rated takeoff power condition.

In a further embodiment of any of the foregoing embodiments, the predetermined design target is defined at a cruise condition.

In a further embodiment of any of the foregoing embodiments, the first compressor section includes 3 or more stage. The second compressor section includes 6 or more stages. The second compressor section is positioned downstream of the first compressor section. The fan drive turbine includes three 3 to six 6 stages, and the at least one turbine includes fewer stages than the fan drive turbine.

In a further embodiment of any of the foregoing embodiments, the power ratio is greater than or equal to 1.0.

These and other features of this disclosure will be better understood upon reading the following specification and drawings, the following of which is a brief description.

DETAILED DESCRIPTION

Figure 1:
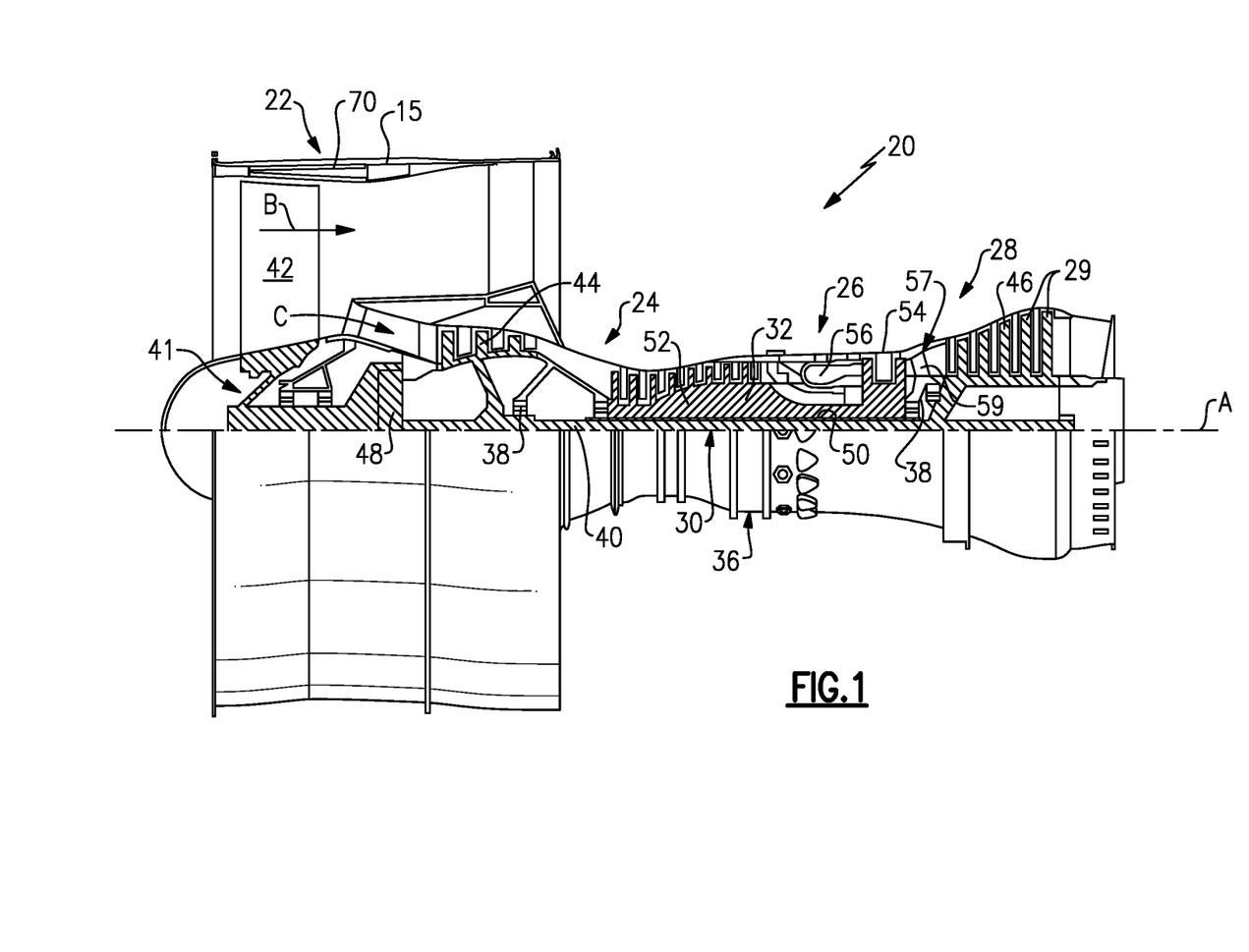
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. In some embodiments, the gear reduction ratio is less than about 5.0, or less than about 4.0. For the purposes of this disclosure, the term "about" means ±3% unless otherwise indicated. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7 °R)]^{0.5}$. The "Low corrected fan tip speed" as disclosed herein according to one non-limiting embodiment is less than about 1150 ft/second.

Figure 2:
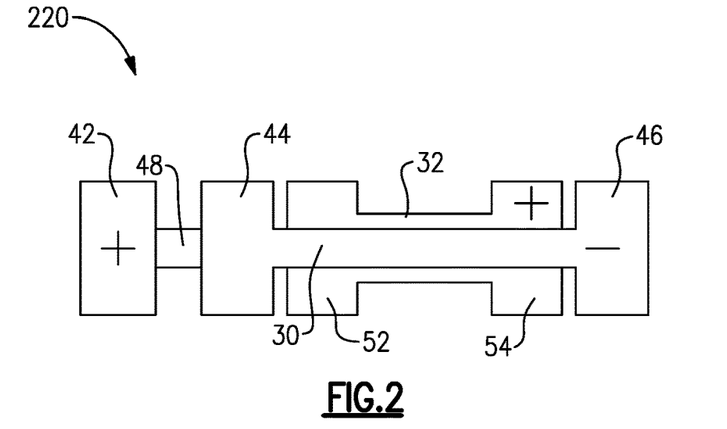
FIG. 2 schematically shows the arrangement of the low and high spool, along with the fan drive of FIG. 1.
Figure 3:
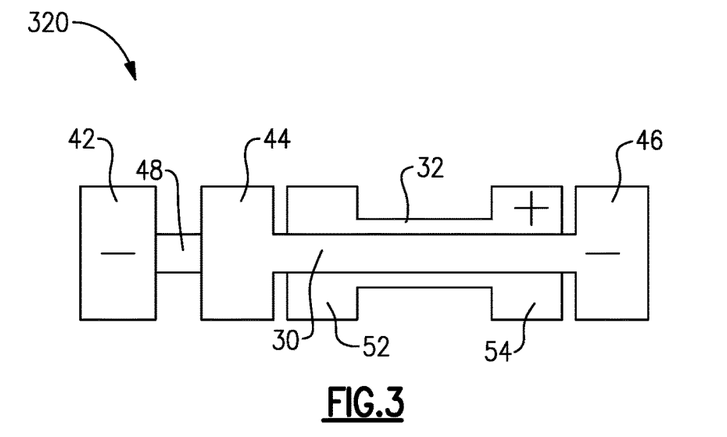
FIG. 3 schematically shows an alternative drive arrangement of FIG. 1.

FIGS. 2 and 3 schematically illustrate engines 220 and 320, each which may generally have the features of engine 20 in FIG. 1. As shown in FIG. 2, the engine 220 may be counter-rotating. This means that the low speed spool 30, including the low pressure turbine 46 and low pressure compressor 44, rotates in one direction ("−"), while the high speed spool 32, including high pressure turbine 54 and high pressure compressor 52, rotates in an opposed direction ("+"). The gear reduction 48, which may be, for example, an epicyclic transmission (e.g., with a sun, ring, and star gears), is selected such that the fan 42 rotates in the same direction ("+") as the high spool 32. In FIG. 3, the fan 42 of engine 320 rotates in the same direction as the low speed spool 30. To achieve this rotation, the gear reduction 48 may be a planetary gear reduction which would cause the fan 42 to rotate in the same direction. Of course, this application extends to engines where the two spools rotate in the same direction.

Figure 4:
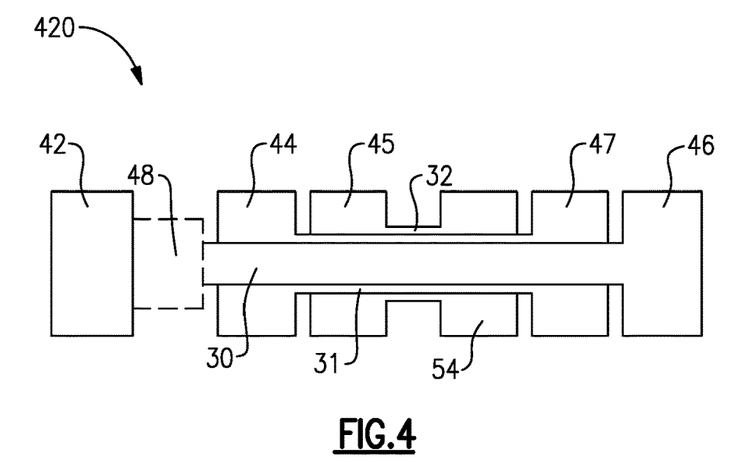
FIG. 4 schematically shows a gas turbine engine including a three-spool architecture.

FIG. 4 schematically illustrates an engine 420 arranged as a three-spool architecture. The engine includes similar features as the engine 20 and also has an intermediate spool 31. The intermediate spool 31 generally includes a low pressure compressor 44 and an intermediate pressure turbine 47 interconnected by a shaft extending along the engine central longitudinal axis A. The low speed spool 30 includes a low pressure or fan drive turbine 46 interconnected with a fan 42. In some embodiments, the engine 420 includes a gear reduction 48 positioned between the low pressure turbine 46 and the fan 42. The gear reduction 48 can be located adjacent to the fan 42 (shown) or adjacent to the low pressure turbine 46 as is known in the art. The fan 42 can be configured to rotate in the same direction or in the opposite direction as the low pressure turbine 46 via the gear reduction 48. In other embodiments, the gear reduction 48 is omitted. With the arrangement of any of the engines 20, 220, 320, 420, and with the other structure as set forth below, including the various quantities and operational ranges, the overall efficiency of the gas turbine engine is greatly increased.

Specific thrust can be used to evaluate the relative bulk of the engine. Specific thrust can be defined in one of two ways as:

$$\text{SpecificThrust} = (F_{Net})/(W_{Atotal}) \quad \text{Equation 1:}$$

$$\text{SpecificThrust} = (1/g_c)/(V_{Jet} - V_o) \quad \text{Equation 2:}$$

where ($F_{Net}$) is the net thrust of the engine measured in (lbf), ($W_{Atotal}$) is the total inlet air mass flow of the engine measured in (lbm per second), ($g_c$) is the gravity constant (32.174 feet×lbm per lbf per second per second), ($V_{Jet}$) is the exhaust velocity measured in (feet per second) at the exit of the engine exhaust nozzle, ($V_o$) is the flight velocity of the aircraft, and specific thrust (SpecificThrust) is measured in lbf/(lb/s). If an aircraft includes more than one engine exhaust nozzle, then ($V_{Jet}$) can be defined as the average of the exhaust velocities of the nozzles. Engines with a low specific thrust are relatively larger in size but have relatively better jet noise and fuel consumption characteristics as compared to engines with a high specific thrust.

The overall efficiency ("$\eta_{overall}$") of a gas turbine engine can be evaluated in terms of its fuel economy or TSFC defined as follows:

$$\text{TSFC} = (V_o/\eta_{overall}) \times ((3600 \text{ seconds/hr})/(J \times LHV)) \quad \text{Equation 3:}$$

where (J) is Joule's derived energy conversion (778 ft×lbf per Btu), ($\eta_{overall}$) is the overall efficiency of the engine, and (LHV) is the fuel lower heating value measured in (Btu divided by lbm). As shown, TSFC increases as flight velocity ($V_o$) of the aircraft increases, and improvements in the overall efficiency of the engine ($\eta_{overall}$) decrease TSFC. Thus, it is desirable to improve the overall efficiency ($\eta_{overall}$) of the engine.

In this disclosure, the overall efficiency of the engine ($\eta_{overall}$) is defined as:

$$\eta_{overall}=(\eta_{propulsive}\times\eta_{thermal}) \quad \text{Equation 4:}$$

where ($\eta_{propulsive}$) is the propulsive efficiency of the engine, and where ($\eta_{thermal}$) is the thermal efficiency of the engine. In turn, thermal efficiency ($\eta_{thermal}$) and propulsive efficiency ($\eta_{propulsive}$) can be defined as:

$$\eta_{thermal}=(\text{CorePower/FuelPower}) \quad \text{Equation 5:}$$

$$\eta_{propulsive}=(\text{ThrustPower/CorePower}) \quad \text{Equation 6:}$$

where thrust power (ThrustPower) is the net thrust of the engine ($F_{NET}$) measured in (lbf multiplied by the flight velocity ($V_o$) measured in ft. per second of the aircraft), fuel power (FuelPower) is the fuel flow rate measured in (lbm/hr multiplied by the fuel lower heating value (LHV) divided by 3600 seconds per hr), and core power (CorePower) is the total power provided by the combination of the spools.

More specifically, thermal efficiency ($\eta_{thermal}$) and propulsive efficiency ($\eta_{propulsive}$) can be defined as:

$$\eta_{thermal}=(\text{CorePower}/J)/(\dot{m}_{fuel}\times\text{LHV}/(3600\text{ seconds/hr})) \quad \text{Equation 7:}$$

$$\eta_{propulsive}=(V_o)/[(g_c/2)\times(F_{Net}/W_{Atotal})+V_o)] \quad \text{Equation 8:}$$

where ($\dot{m}$fuel) is the fuel flow rate to the combustor 56 measured in lbm (pounds mass) per hour.

Figure 5:
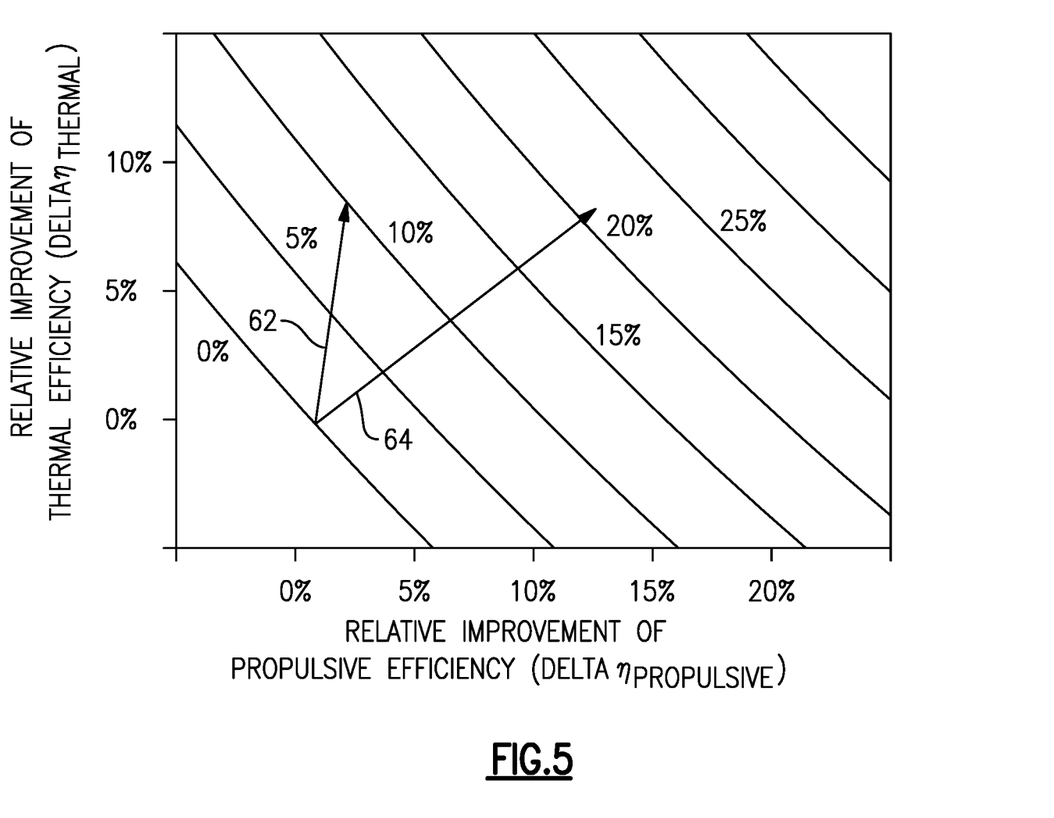
FIG. 5 graphically shows the relationship of propulsive efficiency, thermal efficiency, and overall efficiency for a gas turbine engine embodiment.

FIG. 5 graphically shows the relationship between propulsive efficiency (x-axis), thermal efficiency (y-axis), and the resultant overall efficiency (z-axis) in a gas turbine engine embodiment applying the techniques described herein as compared to prior engines. Engine designers have used various techniques to improve the fuel efficiency. Some approaches to improving fuel efficiency have included increasing the operating pressures and temperatures of the compressor section 24 and high pressure turbine 54 upstream of the fan drive turbine 46, precipitating the need for advanced materials in the turbine and compressor sections.

Vector 62 illustrates efficiency improvements typical of these approaches. Vector 62 has a slope of about 75 to 90 degrees, with an improvement in overall efficiency ($\eta_{overall}$) of about 10%, and about 3% to 0% higher propulsive efficiency ($\eta_{propulsive}$), respectively. Accordingly, these approaches have generally resulted in improvements to the thermal efficiency ($\eta_{thermal}$) but with marginal improvements to propulsive efficiency ($\eta_{propulsive}$) of the engine as a byproduct. Rather, vector 62 demonstrates that prior designers have not been concerned with selecting techniques that consider improvements in thermal efficiency ($\eta_{thermal}$) and propulsive efficiency ($\eta_{propulsive}$) simultaneously. Approaches to improving propulsive efficiency ($\eta_{propulsive}$) have included increasing the bypass ratio (BPR) of the fan section 22, which increases the size and weight of the engine.

Similarly, these approaches to improving propulsive efficiency ($\eta_{propulsive}$) have resulted in marginal improvements to overall efficiency ($\eta_{overall}$). However, the overall efficiency ($\eta_{overall}$) or thrust specific fuel consumption (TSFC) of the engine can be improved by defining an engine architecture that affects propulsive efficiency ($\eta_{propulsive}$) and thermal efficiency ($\eta_{thermal}$) simultaneously, via core power (CorePower).

One embodiment of the engine disclosed herein is illustrated as vector 64. As shown, vector 64 has a slope of about 30 to 60 degrees, which results in an improvement in the overall efficiency ($\eta_{overall}$) of the engine of about 20%, and about 14% to 8% higher propulsive efficiency ($\eta_{propulsive}$), respectively, than prior engines illustrated by vector 62.

The core power (CorePower) of a gas turbine engine can be defined as:

$$\text{CorePower}=(2\times P_{High})/(1+(P_{High}/P_{Low})) \quad \text{Equation 9:}$$

where ($P_{High}$) is the horsepower provided by the high speed spool 32 in a two-spool architecture, or the power provided by the high spool 32 and the intermediate spool 31 in a three-spool architecture; and where ($P_{Low}$) is the horsepower provided by the low spool 30.

A core split power ratio of the high spool ($P_{High}$) (and intermediate spool in a three-spool architecture) and the low spool ($P_{Low}$) can be defined as:

$$(P_{High}/P_{Low})=[((2\times HP_{HPC}\times\eta_{propulsive})/(F_{Net}\times V_o))-1] \quad \text{Equation 10:}$$

where ($HP_{HPC}$) is the horsepower at the (second) high pressure compressor 52 (and intermediate spool in a three-spool architecture). The core split power ratio is greater than 1.0 except when concurrently: 1) the number of stages of the high pressure compressor 52 is less than the number of stages of the low pressure compressor 44; and 2) the number of stages of the high pressure compressor 52 is less than the sum of the number of stages of the high pressure turbine 54 and the number of stages of the low pressure turbine 46. As illustrated by equation 10, the overall efficiency ($\eta_{overall}$) of the engine can be improved by transferring power output from the high spool 32 to the low spool 30. However, prior engine designs have avoided this approach because it imposes undesirable thermal and mechanical stresses on the fan drive turbine 46 based on an increase in power output to drive the fan 42.

In one embodiment made according to the above design, the net thrust ($F_{Net}$) of the engine is 4,650 lbs, the flight velocity ($V_0$) is 779 ft/sec, the propulsive efficiency ($\eta_{propulsive}$) is 0.71, and the power of the high pressure compressor 52 ($HP_{HPC}$) is 10,500 hp. Thus, using Equation 10 above, the core power ratio is:

$$\text{Ratio}=(P_{High}/P_{Low})=[((2\times HP_{HPC}\times\eta_{propulsive})/(F_{Net}\times V_o))-1]=[((2\times 10500\times 550\times 0.71)/(4650\times 779))-1]=1.26$$

where 1 unit of horsepower is equivalent to 550 ft-lbf/sec. In another embodiment, the ratio was about 1.2. In a further embodiment, the ratio was about 0.8. With ratios in the 0.5 to 1.4 range, and with a propulsive efficiency equal to or greater than about 0.65, a very efficient overall gas turbine engine is achieved. More narrowly, ratios equal to or greater than about 0.71 are more efficient. Ratios in the 0.77 to 1.3 range are even more efficient. Even more narrowly, ratios in the 0.9 to 1.1 range are more efficient. In a further embodiment, the ratio was about 1.0, with the horsepower at the each of the low and high spools 30, 32 being approximately equivalent. As a result of these ratios, in particular, the compressor section and turbine section can be made much smaller than in the prior art, both in diameter and axial length. In addition, the efficiency of the overall engine is greatly increased.

The overall efficiency of the disclosed gas turbine engine is much higher than in the prior art. The exemplary gas turbine engine A (described above) and exemplary gas turbine engine B are compared to a direct-drive comparison engine C and a direct-drive base comparison engine D, and can be found in Table 1 as follows:

TABLE 1

|  | Engine A | Engine B | Comp. Engine C | Base Engine D |
|---|---|---|---|---|
| Net Thrust (FNet) (lbs) | 4650 | 3925 | 4880 | 14158 |
| Flight Velocity (Vo) (ft/sec) | 779 | 779 | 779 | 828 |
| Propulsive Efficiency ($\eta_{propulsive}$) | 0.71 | 0.71 | 0.67 | 0.65 |
| Power, High Pressure Compressor ($HP_{HPC}$) | 10500 | 8950 | 12730 | 39838* |
| Core Split Power Ratio ($P_{High}/P_{Low}$) | 1.26 | 1.29 | 1.48 | 1.44 |
| Relative Improvement Propulsive Efficiency ($\eta_{propulsive}$) | 8.6% | 9.0% | 3.1% | Base (0%) |
| Thermal Efficiency ($\eta_{thermal}$) | 0.54 | 0.53 | 0.55 | 0.56 |
| Relative Improvement Thermal Efficiency ($\eta_{thermal}$) | −2.7% | −5.0% | −2.1% | Base (0%) |
| Overall Efficiency ($\eta_{overall}$) | 0.38 | 0.38 | 0.37 | 0.36 |
| Relative Improvement Overall Efficiency ($\eta_{overall}$) | 5.6% | 3.6% | 0.8% | Base (0%) |
| TSFC | 0.51 | 0.52 | 0.53 | 0.57 |
| Relative Improvement TSFC | −10.9% | −9.2% | −6.7% | Base (0%) |

*includes HP for a high pressure compressor and an intermediate pressure compressor Thus, as shown in Table 1, while comparison engine C has a core power ratio of 1.48, comparison engine C has a lower relative improvement in propulsive efficiency ($\eta_{propulsive}$) and overall efficiency ($\eta_{overall}$) than the exemplary gas turbine engines A and B. The exemplary gas turbine engines A and B also have more favorable relative improvements of TSFC than comparison engine C.

Similar benefits to the overall efficiency ($\eta_{overall}$) can be achieved by selecting an arrangement of the high pressure compressor 52 and low compressor 44 with respect to each other. The delta enthalpy rises across the high pressure compressor 52 and the low pressure compressor 44 can be expressed as:

$$(dh_{HPC}) = T_{2.5} \times c_p \times [(PR_{HPC}^{((\gamma-1)/(\eta_{polytropic} \times \gamma))}) - 1] \quad \text{Equation 11:}$$

$$(dh_{LPC}) = T_{2.0} \times c_p \times [(PR_{LPC}^{((\gamma-1)/(\eta_{polytropic} \times \gamma))}) - 1] \quad \text{Equation 12:}$$

where ($T_{2.5}$) is the temperature at the inlet of the high pressure compressor 52 in a two-spool architecture (or approximately $T_{2.2}$ in a three-spool arrangement, measured at the inlet to the intermediate pressure compressor 45), ($PR_{HPC}$) is the pressure ratio across the high pressure compressor 52 (and from the inlet of the intermediate pressure compressor 45 to the exit of the high pressure compressor 52 in a three-spool arrangement), ($T_{2.0}$) is the temperature at the inlet of the low pressure compressor 44 in a two-spool architecture (or approximately $T_1$ in a three-spool arrangement, measured at the inlet to fan 42), ($PR_{LPC}$) is the pressure ratio across the low pressure compressor 44 (or the pressure ratio across the fan 42 in a three-spool arrangement), ($\gamma$) is the ratio of ($c_p$) to ($c_v$), with ($c_p$) being the specific heat capacity measured for a constant pressure process in Btu per lbm per degree Rankine (° R), and being ($c_v$) is the specific heat capacity measured for a constant volume process in Btu per lbm per degree Rankine (° R). Temperatures ($T_{2.0}$), ($T_{2.2}$), and ($T_{2.5}$) are measured in degree Rankine (° R).

The core split power ratio ($P_{High}/P_{Low}$) can be approximated by a ratio of the delta enthalpy rises across the compressors as:

$$(P_{High}/P_{Low}) = (dh_{HPC})/(dh_{LPC}) \quad \text{Equation 13:}$$

where ($dh_{HPC}$) is the delta enthalpy rise across the high pressure compressor 52 measured as exit minus inlet per lb. of airflow through the high pressure compressor 52, and where ($dh_{LPC}$) is the delta enthalpy rise across the low pressure compressor 44 measured as exit minus inlet per lb. of airflow through the low pressure compressor 44. In some examples, engine 20 is designed to define a core split power ratio at a predetermined design target. In some examples, the predetermined design target is defined at sea level and at a static, full-rated takeoff power condition. In other examples, the predetermined design target is defined at a cruise condition.

With ratios of the delta enthalpy rises similar to the core split power ratios disclosed herein, a very efficient overall gas turbine engine is achieved. In the illustrated embodiment, the low pressure compressor 44 includes fewer stages than the high pressure compressor 52. In some embodiments, the low pressure compressor 44 includes 3 or more stages, or more narrowly 3 to 6 stages, such as 4 stages, and the high pressure compressor 52 includes 6 or more stages, or 15 or fewer stages. In some embodiments, the high pressure compressor 52 includes 7 to 15 stages, such as 8 stages. In the illustrated embodiment, the high pressure turbine 54 includes fewer stages than the low pressure turbine 46. In further embodiments, the turbine section 28 includes at least 2 turbine stages upstream of the fan drive turbine 46. In embodiments, the fan drive turbine 46 includes 3 or more stages, or 6 or fewer stages. In some embodiments, the fan drive turbine 46 includes between 3 and 6 stages, such as 5 stages (shown in FIG. 1).

Figures 6, 6A:
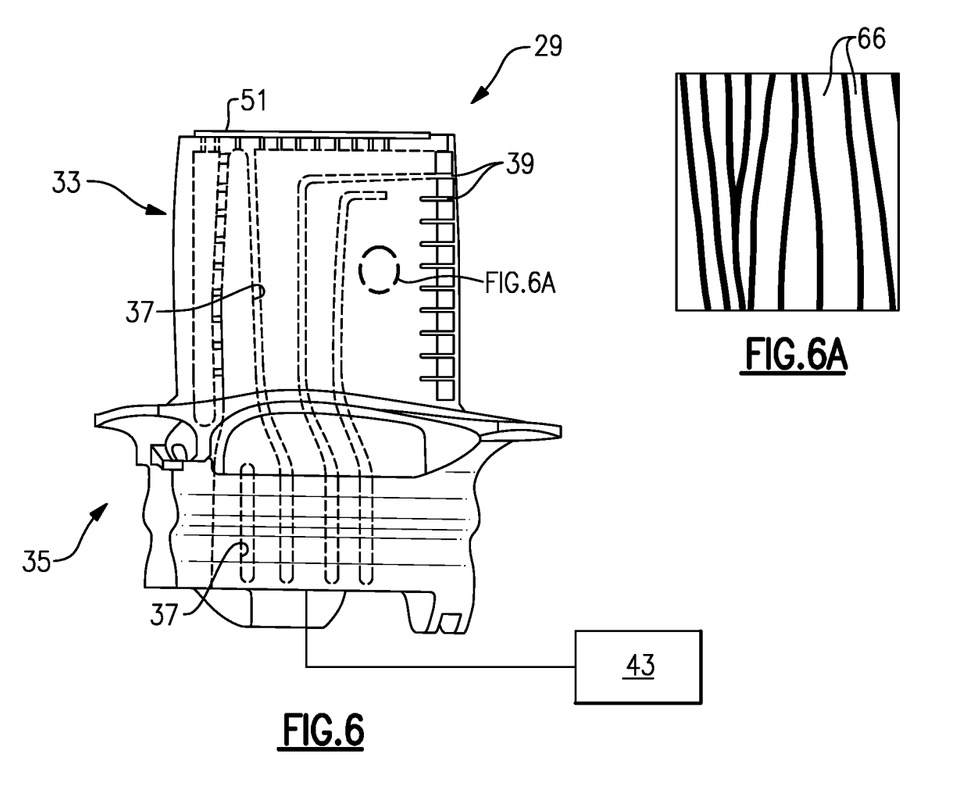
FIG. 6 illustrates a perspective view of a turbine blade.
FIG. 6A illustrates a cross-sectional view of a portion of the turbine blade of FIG. 6 having a directionally solidified microstructure.

The core split power ratios disclosed herein can be combined with one or more features to further improve the propulsive efficiency ($\eta_{propulsive}$) of the engine. As shown in FIG. 6, the turbine section 28, more particularly the low pressure turbine 46, for example, can include one or more turbine blades 29 with features permitting higher inlet temperatures, higher rotational speeds and gear reduction ratios than conventional turbines. The turbine blade 29 includes an airfoil 33 extending radially outward from a root 35. The blade 29 can include one or more cooling features 37 configured to receive coolant from a coolant source 43 (shown schematically) for cooling the blades 29, as is known in the art. In some embodiments, the coolant source 43 is the compressor section 24. The cooling features 37 can be one or more plenums and/or passages formed in the turbine blade 29 to provide impingement or convection cooling. In some embodiments, the cooling features 37 provide coolant to one or more cooling holes 39 for providing film cooling. Each turbine blade 29 can be made of a directionally solidified material (shown schematically in FIG. 6A) or a single-crystal material. Directionally solidified materials include a microstructure having a plurality of elongated grains 66 that are parallel to the major stress axes of the component as is known in the art. Each of the elongated grains 66 can extend the along the airfoil 33 between the root 35 and blade tip 51. Single crystal materials are formed as a single, homogenous crystal of material that includes no grain boundaries in the material, or rather, consist of only one grain. Single crystal materials can include nickel-based super alloys such as Nickel aluminide (NiAl). In further embodiments, the turbine section 28 includes at least two turbine stages upstream of the fan drive turbine 46. Modification of the low pressure turbine 46 with these features enables redistribution of horsepower from the high spool 32 to the low spool 30, which can further result in a reduction of the number of stage counts in the high pressure compressor 52 and a more compact engine arrangement.

Figure 7:
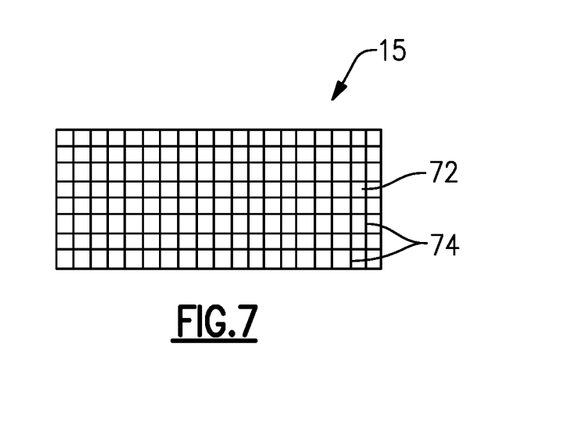
FIG. 7 illustrates a cross-sectional view of a portion of a fan case.

In another embodiment, the fan section 22 includes a hardwall containment system 70 (shown schematically in FIG. 1) arranged about the engine axis A and spaced radially from the fan blades 42. The hardwall containment system 70 is configured to contain, and absorb the impact of, a fan blade 42 separating from a fan hub 41 (shown schematically in FIG. 1) or a fragment thereof. In some embodiments, the hardwall containment system 70 is a hard ballistic liner applied to the nacelle or fan case 15 as is known in the art. The hard ballistic liner can include a rigid material such as a resin impregnated fiber structure, metallic structures, or ceramic structures. However, other materials and structures of the hardwall containment system 70 are contemplated. In yet another embodiment, the fan section 22 includes a fan case 15 made of an organic matrix composite (shown schematically in FIG. 7). The organic matrix composite can include a matrix material 72 and reinforcement fibers 74 distributed through the matrix material 72. The reinforcement fibers 74 may be discontinuous or continuous, depending upon the desired properties of the organic matrix composite, for example. The matrix material 72 may be a thermoset polymer or a thermoplastic polymer. The reinforcement fibers 74 may include carbon graphite, silica glass, silicon carbide, or ceramic. Given this description, one of ordinary skill in the art will recognize that other types of matrix materials and reinforcement fibers may be used. In further embodiments, the fan section 22 includes a fan blade and a disk with a characteristic density of less than about 13.1 pounds per in^2 of frontal area with respect to the engine. In some embodiments, the fan section 22 has a fan blade efficiency greater than about 94.5%, being defined as the amount of thrust generated by the fan blade 42 compared to the work provided to the fan blade 42 by the gear reduction 48 or low speed spool 30. In further embodiments, the bypass ratio (BPR) which is defined as a volume of air passing to the bypass duct compared to a volume of air passing into the compressor section 24 is greater than about 12:1. In some embodiments, the bypass ratio is less than about thirty (30), or more narrowly less than about twenty (20).

The core power ratios disclosed herein can be combined with one or more features to further improve the thermal efficiency ($\eta_{thermal}$) of the engine, expressed below in quantities at a flight condition of 0.8 Mach and 35,000 feet. In some embodiments, the low pressure turbine 46 is configured to rotate at least about 2.6 times faster than the fan section 22 and preferably at least about 2.9 times faster than the fan section 22. In further embodiments, an overall pressure ratio (OPR) of the engine provided by a combination of the low pressure compressor 44 and the high pressure compressor 52 and the pressure rise at the root of the fan section 22 is equal to or greater than about 36. In another embodiment, the fan section 22 defines a fan pressure ratio less than about 1.50 and preferably less than about 1.40, the low pressure turbine 46 is configured to rotate at least about 2.6 times faster than the fan section 22 and preferably at least 2.9 times faster than the fan section 22, the overall pressure ratio is equal to or greater than about 36 corresponding to a predetermined design target, and the turbine section 28 includes at least two turbine stages upstream of the low pressure turbine 46. In other examples, an overall pressure ratio corresponding to the predetermined design target is greater than or equal to about 40:1, or greater than or equal to about 50:1. In examples, the overall pressure ratio corresponding to the predetermined design target is less than or equal to about 80:1, or more narrowly less than or equal to about 60:1.

In some embodiments, the fan section 22 has a fan blade efficiency greater than about 94.5%, the fan drive turbine 46 has a thermal efficiency greater than about 90.9%, and the low pressure compressor 44 has a thermal efficiency of at least about 87% and is configured to deliver air to the high pressure compressor 52 having a thermal efficiency of at least about 85.1%. With respect to the compressor section 24, thermal efficiency can be defined as the pressure rise versus the temperature rise between an inlet and an outlet of one of the low pressure and high pressure compressors 44, 52. Thermal efficiency with respect to the fan drive turbine 46 is defined as the pressure decrease between the inlet and the outlet as compared to the work transferred to the low speed spool 30. In further embodiments, the cooling air flow to the turbine section 28 is less than or equal to about 36% of the core airflow along the core airflow path C, which increases the amount of compressed air provided to the combustor section 26. In other embodiments, the gear arrangement 48 has a thermal efficiency at sea-level takeoff and at stationary conditions of greater than about 98.7% as measured by the oil temperature rise between an inlet and an outlet of the gear arrangement 48.

Engines made with the disclosed architecture, and including spool arrangements as set forth in this application, and with modifications coming from the scope of the claims in this application, thus provide very high efficient operation, have increased fuel efficiency, and are compact and lightweight relative to their thrust capability. Two-spool and three-spool direct drive engine architectures can also benefit from the teachings herein.

It should be understood that relative positional terms such as "forward," "aft," "upper," "lower," "above," "below," and the like are with reference to the normal operational attitude of the vehicle and should not be considered otherwise limiting.

While this invention has been disclosed with reference to one embodiment, it should be understood that certain modifications would come within the scope of this invention. For that reason, the following claims should be studied to determine the true scope and content of this invention.

What is claimed is:
1. A turbofan engine comprising:
    a fan section including a plurality of fan blades and a fan case surrounding the plurality of fan blades to define a bypass duct, the fan section defining a fan pressure ratio of less than 1.40 across the fan blade alone, the fan section having a low corrected fan tip speed of less than 1150 ft/sec, and the low corrected fan tip speed being an actual fan tip speed divided by [(Tram ° R)/(518.7° R)]^0.5;
    a gear arrangement including a gear reduction ratio greater than 2.3;

a compressor section including a low pressure compressor and a high pressure compressor, the low pressure compressor including 3 or more stages, and the high pressure compressor including greater than or equal to 8 stages;

a turbine section including a fan drive turbine and a two-stage high pressure turbine, the high pressure turbine driving the high pressure compressor, the fan drive turbine driving the low pressure compressor and driving the gear arrangement to drive the fan section, and the fan drive turbine including between three and six stages;

wherein the fan drive turbine includes an inlet, an outlet, and a fan drive turbine pressure ratio greater than 5, and the fan drive turbine pressure ratio is pressure measured prior to the inlet as related to pressure at the outlet prior to any exhaust nozzle;

wherein a core split power ratio is provided by a second power input to the high pressure compressor measured in horsepower divided by a first power input to the low pressure compressor measured in horsepower, the core split power ratio being equal to, or greater than, 1.0 and less than, or equal to, 1.4;

wherein an overall pressure ratio is provided by the combination of the low pressure compressor, the high pressure compressor and a fan root pressure rise of the fan section, the overall pressure ratio being equal to or greater than 36; and wherein the fan section delivers a portion of air into the compressor section, and a portion of air into the bypass duct, and wherein a bypass ratio, which is defined as a volume of the portion of air passing into the bypass duct compared to a volume of the portion of air passing into the compressor section, being greater than 12.

2. The turbofan engine as set forth in claim 1, wherein:

the fan section has a fan blade efficiency greater than 94.5%, the fan blade efficiency defined as an amount of thrust generated by a first fan blade of the plurality of fan blades compared to the work provided to the first fan blade by the gear arrangement;

the fan drive turbine has a thermal efficiency greater than 90.9%, the thermal efficiency of the fan drive turbine defined as a pressure decrease between the inlet and the outlet as compared to the work transferred to a low speed spool, the low speed spool including the low pressure compressor and the fan drive turbine; and the low pressure compressor has a thermal efficiency of at least 87% and delivers air to the high pressure compressor having a thermal efficiency of at least 85.1%, the thermal efficiency of the high and low pressure compressors defined as a pressure rise versus a temperature rise between an inlet and an outlet of a respective one of the low pressure and high pressure compressors.

3. The turbofan engine as set forth in claim 2, wherein the gear arrangement has a thermal efficiency at sea-level take-off of greater than 98.7% as measured by an oil temperature rise between an inlet and an outlet of the gear arrangement.

4. The turbofan engine as set forth in claim 3, wherein the fan case is made of an organic matrix composite.

5. The turbofan engine as set forth in claim 4, wherein the fan section includes a disk with a characteristic density of less than 13.1 pounds per in^2 of frontal area with respect to the turbofan engine.

6. The turbofan engine as set forth in claim 5, wherein the fan drive turbine rotates at least 2.6 times faster than the fan section in operation.

7. The turbofan engine as set forth in claim 6, wherein the core split power ratio is less than 1.3.

8. The turbofan engine as set forth in claim 7, wherein the gear arrangement is a planetary gear system, and the gear reduction ratio is greater than 2.9.

9. The turbofan engine as set forth in claim 7, wherein the overall pressure ratio is greater than 50.

10. The turbofan engine as set forth in claim 9, wherein the gear arrangement is a planetary gear system, and the gear reduction ratio is greater than 2.9.

11. The turbofan engine as set forth in claim 10, wherein the core split power ratio is less than 1.27.

12. The turbofan engine as set forth in claim 10, wherein the turbine section includes a mid-turbine frame between the high pressure turbine and the fan drive turbine, the mid-turbine frame includes airfoils in a core flow path, and the mid-turbine frame supports bearing systems in the turbine section.

13. The turbofan engine as set forth in claim 12, wherein the core split power ratio is less than 1.27.

14. The turbofan engine as set forth in claim 9, wherein the core split power ratio is less than 1.27.

15. A turbofan engine comprising:

a fan section including a plurality of fan blades and a fan case surrounding the plurality of fan blades to define a bypass duct, the fan section defining a fan pressure ratio of less than 1.45 across the fan blade alone;

a gear arrangement;

a compressor section including a low pressure compressor and a high pressure compressor;

a turbine section including a fan drive turbine and a high pressure turbine, the high pressure turbine driving the high pressure compressor, the fan drive turbine driving the low pressure compressor and driving the gear arrangement to drive the fan section, the fan drive turbine including six or fewer stages;

wherein the fan drive turbine includes an inlet, an outlet, and a fan drive turbine pressure ratio greater than 5, and the fan drive turbine pressure ratio is a pressure measured prior to the inlet as related to a pressure at the outlet prior to any exhaust nozzle;

wherein a core split power ratio is provided by a second power input to the high pressure compressor measured in horsepower divided by a first power input to the low pressure compressor measured in horsepower, the core split power ratio being equal to, or greater than, 1.0 and less than, or equal to, 1.4;

wherein an overall pressure ratio is provided by the combination of the low pressure compressor, the high pressure compressor and a fan root pressure rise of the fan section, the overall pressure ratio being equal to or greater than 36; and wherein the fan section delivers a portion of air into the compressor section, and a portion of air into the bypass duct, and wherein a bypass ratio, which is defined as a volume of the portion of air passing into the bypass duct compared to a volume of the portion of air passing into the compressor section, being greater than 12.

16. The turbofan engine as set forth in claim 15, wherein the gear arrangement includes a gear reduction ratio greater than 2.3.

17. The turbofan engine as set forth in claim 16, wherein the fan drive turbine includes three or more stages.

18. The turbofan engine as set forth in claim 17, wherein the high pressure turbine is a two stage high pressure turbine.

19. The turbofan engine as set forth in claim 18, wherein the gear arrangement is an epicyclic gear train, and the epicyclic gear train is a planetary gear system.

20. The turbofan engine as set forth in claim 19, wherein the gear reduction ratio is greater than 2.6, and the fan pressure ratio is less than 1.40 across the fan blade alone.

21. The turbofan engine as set forth in claim 19, wherein the fan section has a fan tip speed of less than 1150 ft/sec.

22. The turbofan engine as set forth in claim 21, wherein the low pressure compressor includes 3 or more stages.

23. The turbofan engine as set forth in claim 22, wherein the high pressure compressor including greater than or equal to 8 stages and less than or equal to 15 stages.

24. The turbofan engine as set forth in claim 23, wherein the core split power ratio is at a predetermined design target that is defined at sea level and at a static, full-rated takeoff power condition.

25. The turbofan engine as set forth in claim 24, wherein:
the fan section has a fan blade efficiency greater than 94.5%, the fan blade efficiency defined as an amount of thrust generated by a first fan blade of the plurality of fan blades compared to the work provided to the first fan blade by the gear arrangement;
the fan drive turbine has a thermal efficiency greater than 90.9%, the thermal efficiency of the fan drive turbine defined as a pressure decrease between the inlet and the outlet as compared to the work transferred to a low speed spool, the low speed spool including the low pressure compressor and the fan drive turbine;
the low pressure compressor has a thermal efficiency of at least 87% and delivers air to the high pressure compressor having a thermal efficiency of at least 85.1%, the thermal efficiency of the high pressure compressor and the low pressure compressor defined as a pressure rise versus a temperature rise between an inlet of the low pressure compressor and an outlet of the high pressure compressor; and
the gear arrangement has a thermal efficiency at sea-level takeoff of greater than 98.7% as measured by an oil temperature rise between an inlet and an outlet of the gear arrangement.

26. The turbofan engine as set forth in claim 25, wherein the core split power ratio is less than 1.3.

27. The turbofan engine as set forth in claim 26, wherein the overall pressure ratio is greater than 50.

28. The turbofan engine as set forth in claim 26, wherein the fan case is made of an organic matrix composite.

29. The turbofan engine as set forth in claim 28, wherein the fan section includes a disk with a characteristic density of less than 13.1 pounds per in^2 of frontal area with respect to the turbofan engine.

30. The turbofan engine as set forth in claim 29, wherein the fan drive turbine rotates at least 2.6 times faster than the fan section in operation.

31. The turbofan engine as set forth in claim 30, wherein the core split power ratio is less than 1.27.

32. The turbofan engine as set forth in claim 31, wherein the overall pressure ratio is greater than 50.

33. The turbofan engine as set forth in claim 32, wherein the fan pressure ratio is less than 1.40 across the fan blade alone.

34. The turbofan engine as set forth in claim 33, wherein the gear reduction ratio is greater than 2.9.

* * * * *